UNITED STATES PATENT OFFICE.

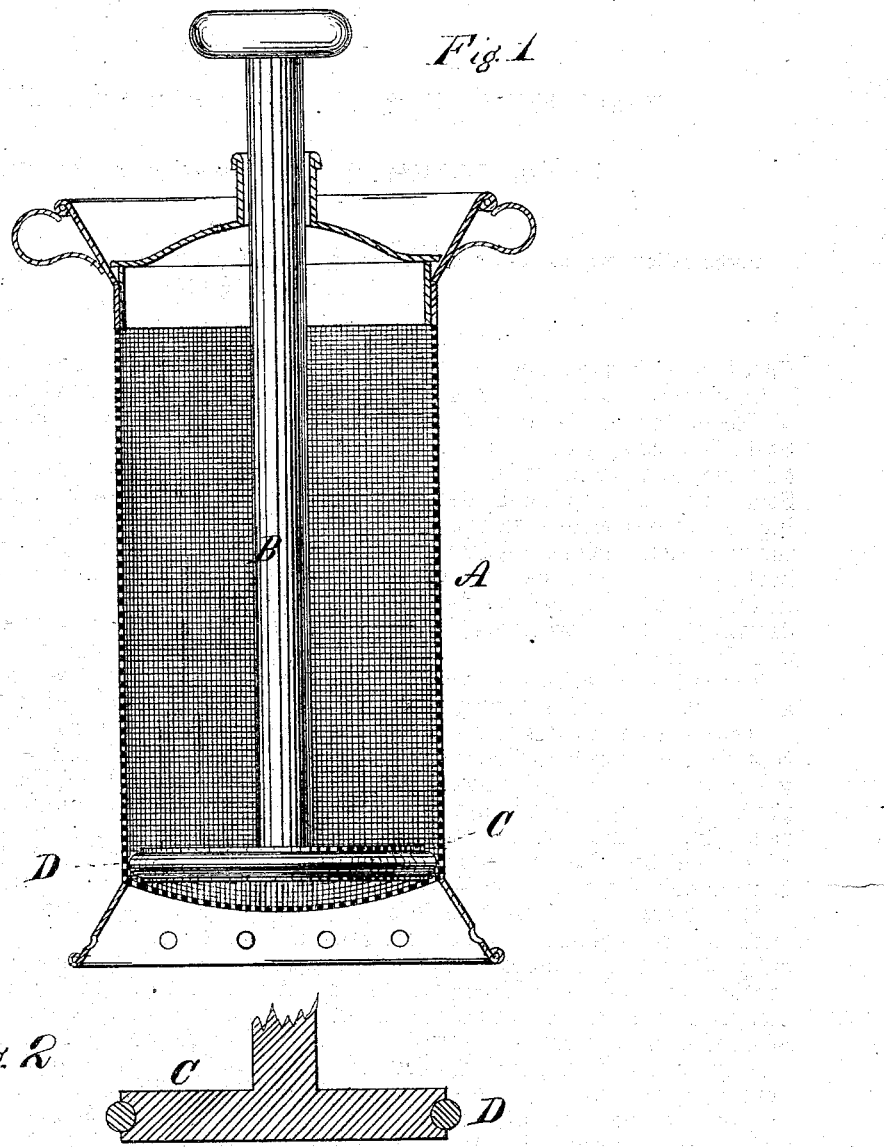

WILLIAMSON GRAHAM, OF ROCHESTER, PENNSYLVANIA.

IMPROVEMENT IN STARCH-STRAINERS.

Specification forming part of Letters Patent No. 158,486, dated January 5, 1375; application filed November 13, 1874.

*To all whom it may concern:*

Be it known that I, WILLIAMSON GRAHAM, of Rochester, in the county of Beaver and State of Pennsylvania, have invented a certain new and useful Improvement in Starch-Strainers; and I do hereby declare the following to be a full, clear, and exact description of the invention, such as will enable others skilled in the art to which it pertains to make and use it, reference being had to the accompanying drawings, which form part of this specification, in which—

Figure 1 is a vertical section. Fig. 2 is an axial section of disk and ring.

My invention relates to an improvement in that class of starch-strainers wherein a plunger is used to force the starch through the perforations, and is more particularly intended as an improvement in the starch-strainer for which Letters Patent were granted to me bearing date October 6, 1874, No. 155,719.

The object of my invention is to do away with the inconvenience arising from the difficulty of making a perfect fit of the plunger to the bore of the cylinder, as well as the stoppage of the same by swelling, when made of wood or other porous material.

A further and important object of my invention is to provide a more effective means of keeping the perforations in the strainer-walls clean and open than is furnished by the ordinary wooden piston. For this purpose I make the disk of the plunger somewhat smaller than the bore of the bowl or cylinder, groove it laterally around its periphery, and place in the groove a gum ring. For the most satisfactory results this groove should be of a depth sufficient to retain the ring securely in place, say, the depth of half its section. This leaves enough of the ring extending beyond the disk to effect its purpose.

Reference being had to the accompanying drawings, A represents a starch-strainer of the kind mentioned above; and B, the plunger, with its disk C grooved and made smaller than the bore of the cylinder or bowl. D is the gum ring, which is also shown in section in Fig. 2.

Where the plain wooden plunger is used, the moisture from the starch causes it to swell, and thus to become tight, and sometimes unmanageable. The friction from this will soon wear the plunger down till it becomes too loose.

The gum ring keeps the joint always closed, does not wear away readily, and permits a smooth and free motion of the plunger. The yielding and springy nature of gum also serves to keep the strainer clean, by means of the tendency to push out through the perforations in the walls of the strainer, and thus saves trouble in cleaning.

I am well aware of the use of india-rubber as packing for steam-pistons, water-cocks, and the like. I, therefore, do not claim any broad application of it to the formation of a tight joint.

The distinctive peculiarity of my invention is to be found by reference to the function of the packing in its novel combination with the perforated body of a starch-strainer.

I do not employ the rubber ring to produce merely a tight joint, but chiefly for the purpose of thoroughly cleaning the strainer and preventing the clogging of the perforations.

Having described my invention, I claim—

In starch-strainers having peforated walls A, the combination of the plunger B, grooved disk C, and gum ring D, substantially as shown and described.

In testimony that I claim the foregoing I have hereunto set my hand this 5th day of November, 1874.

WILLIAMSON GRAHAM.

Witnesses:
S. A. BARR,
T. J. McTIGHE.